United States Patent
Caroselli, Jr. et al.

(10) Patent No.: US 11,798,533 B2
(45) Date of Patent: Oct. 24, 2023

(54) CONTEXT AWARE BEAMFORMING OF AUDIO DATA

(71) Applicant: Google LLC, Mountain View, CA (US)

(72) Inventors: Joseph Caroselli, Jr., Palo Alto, CA (US); Yiteng Huang, Basking Ridge, NJ (US); Arun Narayanan, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 17/221,220

(22) Filed: Apr. 2, 2021

(65) Prior Publication Data

US 2022/0319498 A1    Oct. 6, 2022

(51) Int. Cl.
*G10L 15/08*       (2006.01)
*G10L 21/0216*   (2013.01)
(Continued)

(52) U.S. Cl.
CPC ............ *G10L 15/083* (2013.01); *G06N 20/00* (2019.01); *G10L 15/05* (2013.01);
(Continued)

(58) Field of Classification Search
CPC ... G10L 15/083; G10L 15/05; G10L 21/0216; G10L 2015/088; G10L 2021/02166; G10L 17/00; G10L 21/0264; G06N 20/00
See application file for complete search history.

(56) References Cited

U.S. PATENT DOCUMENTS 9,972,339 B1 * 5/2018 Sundaram ................ G10L 25/30
10,304,475 B1 * 5/2019 Wang ......................... G01S 3/80
(Continued)

FOREIGN PATENT DOCUMENTS

JP         2020003751 A *  1/2020 ......... G10L 21/0208
WO    WO-2013049739 A2 *  4/2013 ........... G01S 3/8006
WO    WO-2020222935 A1 * 11/2020 ............. G10L 15/08

OTHER PUBLICATIONS

D. K., P. R. and M. M. P., "Real-time Multi Source Speech Enhancement for Voice Personal Assistant by using Linear Array Microphone based on Spatial Signal Processing," 2019 International Conference on Communication and Signal Processing (ICCSP), 2019, pp. 0965-0967, doi: 10.1109/ICCSP.2019.8698030. (Year: 2019).*

(Continued)

*Primary Examiner* — Bhavesh M Mehta
*Assistant Examiner* — Philip H Lam
(74) *Attorney, Agent, or Firm* — Gray Ice Higdon

(57) ABSTRACT

Implementations disclosed herein are directed to initializing and utilizing a beamformer in processing of audio data received at a computing device. The computing device can: receive audio data that captures a spoken utterance of a user, determine that a first audio data segment of the audio data includes one or more particular words or phrases; obtain a preceding audio data segment that precedes the first audio data segment; estimate a spatial correlation matrix based on the first audio data segment and based on the preceding audio data segment; initialize the beamformer based on the estimated spatial correlation matrix; and cause the initialized beamformer to be utilized in processing of at least a second audio data segment of the audio data. Additionally, or alternatively, the computing device can transmit the spatial correlation matrix to server(s), and the server(s) can transmit the initialized beamformer back to the computing device.

19 Claims, 3 Drawing Sheets

(51) Int. Cl.
    *G06N 20/00* (2019.01)
    *G10L 15/05* (2013.01)
(52) U.S. Cl.
    CPC .... *G10L 21/0216* (2013.01); *G10L 2015/088* (2013.01); *G10L 2021/02166* (2013.01)

(56) References Cited

U.S. PATENT DOCUMENTS

| | | | | |
|---|---|---|---|---|
| 10,638,252 | B1* | 4/2020 | Donley | H04R 1/1083 |
| 2003/0161097 | A1* | 8/2003 | Le | H04M 1/6058 |
| | | | | 361/679.03 |
| 2018/0218747 | A1* | 8/2018 | Moghimi | H04R 3/005 |
| 2020/0066263 | A1* | 2/2020 | Hughes | G10L 15/20 |
| 2020/0175978 | A1* | 6/2020 | LaBosco | G10L 15/30 |
| 2021/0067867 | A1* | 3/2021 | Kagoshima | H04R 1/32 |
| 2021/0390952 | A1* | 12/2021 | Masnadi-Shirazi | G10L 15/20 |
| 2022/0068288 | A1* | 3/2022 | Nakatani | H04R 3/00 |

OTHER PUBLICATIONS

R. Haeb-Umbach et al., "Speech Processing for Digital Home Assistants: Combining Signal Processing With Deep-Learning Techniques," in IEEE Signal Processing Magazine, vol. 36, No. 6, pp. 111-124, Nov. 2019, doi: 10.1109/MSP.2019.2918706. (Year: 2019).*

H. Taherian, Z. -Q. Wang, J. Chang and D. Wang, "Robust Speaker Recognition Based on Single-Channel and Multi-Channel Speech Enhancement," in IEEE/ACM Transactions on Audio, Speech, and Language Processing, vol. 28, pp. 1293-1302, 2020, doi: 10.1109/TASLP.2020.2986896. (Year: 2020).*

Wang, Z. Q., & Wang, D. (Sep. 2018). All-Neural Multi-Channel Speech Enhancement. In Interspeech (pp. 3234-3238) (Year: 2018).*

Dahlan, R. (Nov. 2018). AdaBoost noise estimator for subspace based speech enhancement. In 2018 international conference on computer, Control, informatics and its applications (IC3INA) (pp. 110-113). (Year: 2018).*

Higuchi, T., Ito, N., Yoshioka, T., & Nakatani, T. (Mar. 2016). Robust MVDR beamforming using time-frequency masks for online/offline ASR in noise. In 2016 IEEE International Conference on Acoustics, Speech and Signal Processing (ICASSP) (pp. 5210-5214) (Year: 2016).*

Rojas, "Two-Degree of Freedom Controller Design for Signal-to-Noise Ratio Reduction" American Control Conference. 2017. 6 pages.

Menne et al., "Speaker Adapted Beamforming for Multi-Channel Automatic Speech Recoition" arXiv: 1806.07407v1 [cs.CL] dated Jun. 19, 2018. 5 pages.

Khabbazibasmenj et al., "Robust Adaptive Beamforming Based on Steering Vector Estimation with as Little as Possible Prior Information" IEEE Transactions on Signal Processing. vol. 60, No. 6, Jun. 2012. 14 pages.

Markovich et al., "Multichannel Eigenspace Beamforming in a Reverberant Noisy Environment With Multiple Interfering Speech Signals" IEEE Transactions on Audio, Speech, and Language Processing, vol. 17, No. 6. Aug. 2009. 16 pages.

Shimada et al., "Unsupervised Beamforming Based on Multichannel Non-Negative Matrix Factorization for Noisy Speech Recognition" ICASSP, IEEE. 2018. 5 pages.

* cited by examiner

CONTEXT AWARE BEAMFORMING OF AUDIO DATA

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Automated assistants typically rely upon a pipeline of components in interpreting and responding to user requests. For example, an automatic speech recognition (ASR) engine can be used to process audio data that correspond to a spoken utterance, to generate a transcription (i.e., sequence of term(s) and/or other token(s)) of the user's utterance. However, in performing ASR, certain term(s) may be misrecognized. This misrecognition may be amplified when the user who provided the spoken utterance is located in a noisy environment (e.g., other user's conversing in the background, media playing in the background, and/or other ambient noises). As a result, the automated assistant may perform an action that was not intended by the user. This can cause the user to repeat the same spoken utterance (which may be misrecognized again) or cause the user to perform some other action, thereby prolonging the human-to-computer dialog and/or causing the user to consume additional computational resources beyond the human-to-computer dialog.

Beamforming is one technique utilized to filter audio data prior to the audio data being processed by an ASR engine or other acoustic-based engine. In beamforming, portions of the audio data from a desired source (e.g., the user who provided the spoken utterance) can be identified for inclusion in filtered audio data, while portions of the audio data from undesired source(s) (e.g., noise from the other user's conversing in the background, the media playing in the background, and/or the other ambient noises) can be removed from the filtered audio data. However, computing devices that employ these beamforming techniques are often located in dynamic environments with dynamic noise (e.g., the user's home, the user's office, and/or other locations). As a result, beamforming of audio data of these environments can result in the portions of the audio data from a desired source being removed from filtered audio data, while the portions of the audio data from the undesired source(s) being identified for inclusion in the filtered audio data.

SUMMARY

Implementations disclosed herein are directed to initializing and utilizing a beamformer in processing of audio data received at a computing device. The computing device can receive audio data that captures a spoken utterance of a user. The spoken utterance can be captured by two or more microphones of the computing device. Further, the computing device can identify a first audio data segment of the audio data. In some implementations, the computing device can identify the first audio data segment in response to determining that the first audio data segment of the audio data includes one or more particular words or phrases (e.g., identify "Hey Assistant", "Okay Assistant", "Assistant", etc. using a hotword detection model). In additional or alternative implementations, the computing device can identify the first audio data segment in response to determining the first segment of the audio data follows a particular invocation of an automated assistant at the computing device (e.g., identify an invocation gesture that is captured by one or more vision components of the computing device and that invokes an automated assistant using a hotword free invocation model, identify a button press at the computing device that invokes an automated assistant, etc.). Further, the computing device can obtain a preceding audio data segment that precedes the first audio data segment. The preceding audio data segment can be stored in an audio buffer of the computing device, and can capture ambient noise of an environment of the computing device immediately prior to the spoken utterance of the user being received. Moreover, the computing device can estimate a spatial correlation matrix based on the first audio data segment and based on the preceding audio data segment, initialize the beamformer based on the estimated spatial correlation matrix, and cause the initialized beamformer to be utilized in processing of at least a second audio data segment of the audio data that follows the first audio data segment.

For example, assume a user of a computing device provides a spoken utterance of "Hey Assistant, call Mom". In this example, the computing device can process audio data capturing the spoken utterance to determine a first audio data segment includes one or more particular words or phrases (e.g., "Hey Assistant"). Further assume that the computing device stored, in an on-device audio buffer, at least a preceding audio data segment that includes audio data capturing ambient noise of an environment of the computing device immediately prior to receiving the spoken utterance (e.g., 1.5 seconds of audio data, 3.0 seconds of audio data, and/or segments of audio data of other durations). The ambient noise can correspond to, for example, other users in the environment of the computing device conversing, media (e.g., music, TV show, movie, etc.) playing in the environment of the computing device, and/or other ambient noises. The computing device can estimate the spatial correlation matrix based on the first audio segment and the preceding audio data segment. The estimated spatial correlation matrix can be used to "steer" the beamformer towards a source of the desired audio data (e.g., the user). This enables the beamformer to filter any additional audio data (e.g., at least the second audio data segment) prior to any subsequent processing by various acoustic-based machine learning (ML) models.

In some implementations, the computing device can determine a first audio segment spatial covariance associated with the first audio data segment, and can determine a preceding audio data segment spatial covariance associated with the preceding audio data segment. Further, the computing device can estimate the spatial correlation matrix based on the first audio segment spatial covariance and the preceding audio data segment spatial covariance. In other words, the computing device can determine a difference between the spatial covariance of the noisy audio data (e.g., the first audio data segment of the audio data) and the noise alone (e.g., the preceding audio data segment) for different audio channels of the computing device.

In some implementations, the computing device can determine a principal eigenvector of the estimated spatial correlation matrix, and can initialize a plurality of coefficients for the beamformer based on the principal eigenvector (or based on other characteristics of the spatial correlation matrix). For example, the computing device can process a first channel of at least the second audio data segment data using first coefficient(s), of the plurality of the coefficients, and the computing device can process a second channel of at least the second audio data segment using second coefficient(s), of the plurality of the coefficients. In this example, the first channel of at least the second audio data segment can be generated using a first microphone, of the two or more microphones, of the computing device, and the second channel of at least the second audio data segment can be generated using a second microphone, of the two or more microphones. In other words, the beamformer can be "steered" towards the source of the desired audio data (e.g., the user), such that audio data generated by multiple channels of the computing device can be filtered to include the desired audio data while reducing any undesired audio data.

In some implementations, the acoustic-based ML model that is utilized to process at least the second audio data segment can be an automatic speech recognition (ASR) model. In these implementations, the beamformer can be utilized to filter the second audio data segment, resulting in a filtered second audio data segment, and the computing device can process, using the ASR model, the filtered second audio data segment to generate one or more recognized terms corresponding to the second audio data segment (and optionally displaying a transcription of the one or more terms if the computing device includes a display). By processing the filtered second audio data segment (as opposed to the raw second audio data segment), ASR can be improved at the computing device, especially in noisy environments. The automated assistant can optionally perform one or more actions (e.g., "call Mom" from the above working example) based on the one or more terms. In some implementations, the acoustic-based ML model that is utilized to process at least the second audio data segment can be a speaker identification model. In these implementations, the beamformer can be utilized to filter the second audio data segment, resulting in a filtered second audio data segment, and the computing device can process, using the speaker identification model, the filtered second audio data segment to identify the user who provided the spoken utterance (e.g., "John Doe"), assuming a speaker embedding for the user is available at the client device. By processing the filtered second audio data segment (as opposed to the raw second audio data segment), speaker identification can also be improved at the computing device, especially in noisy environments. Further, and subsequent to the user being identified, the speaker embedding can be utilized, in addition to the beamformer, to filter audio data that originates from the desired source (e.g., the identified user). The above examples are merely provided for the sake of illustration, and it should be understood that the filtered audio data can be subsequently processed using any acoustic-based ML model.

In some additional or alternative implementations, one or more servers can be utilized in initiating the beamformer and/or utilizing the beamformer in processing at least the second audio data segment. For example, the audio data and the preceding audio data can be transmitted to one or more of the servers, and one or more of the servers can estimate the spatial correlation matrix to initialize the beamformer. In some examples, one or more of the servers can transmit the initialized beamformer back to the computing device. In additional or alternative examples, one or more of the servers can process at least the second audio data segment, and can transmit a filtered second audio data segment back to the computing device. In other additional or alternative examples, one or more of the servers can process the filtered second audio data segment to generate responsive content to the spoken utterance, and transmit the responsive content back to the computing device. However, implementations that include one or more of the servers can have various performance drawbacks (e.g., latency, network resource consumption, etc.).

Although techniques are described herein with respect to the computing device including only two microphones, it should be understood that is for the sake of example and is not meant to be limiting. For example, the computing device can include N microphones (where N is a positive integer of two or more), and the techniques described herein can be utilized to initialize and utilize the beamformer in the same or similar manner. However, in implementations where the computing device includes more than microphones, the estimated spatial correlation matrix may be of a larger size, and the plurality of coefficients used to initialize the beamformer may be greater in quantity. Nonetheless, the techniques described herein are scalable to N microphones and may result in further improvements in filtering of audio data when N is increased.

Moreover, although techniques are described herein with respect to simply initializing and utilizing the beamformer, it should be understood that is also for the sake of example and is not meant to be limiting. For example, the beamformer can be initialized as described herein at the beginning of a dialog session between the user of the computing device that provided the spoken utterance and the automated assistant. Further, the beamformer can be refined throughout the dialog session between the user and the automated assistant by re-estimating the spatial correlation matrix based on additional audio data that captures additional spoken utterances of the user and additional audio data that captures ambient noise of the environment of the computing device. Accordingly, the techniques described herein enable the user to move freely throughout the environment of the computing device during the dialog session with the automated assistant. Further, the techniques described herein enable the beamformer to be re-initialized when a subsequent dialog session between the user and the automated assistant is initiated.

By using the techniques described herein, various technical advantages can be achieved. As one non-limiting example, by initializing and utilizing the beamformer based on the estimated spatial correlation matrix, the beamformer can be adapted to various environments to filter noisy audio data. As a result, the acoustic-based ML model(s) that subsequently process the filtered audio data have greater precision and/or recall in processing the filtered noisy audio data. As another non-limiting example, by refining the estimated spatial correlation matrix throughout a dialog session (and for subsequent dialog sessions), the beamformer can be adapted to these various environments by filtering noisy audio data in a dynamic manner and by tracking a source of the desired audio data (e.g., the user). As a result, the beamformer can be dynamically "steered" towards the source of the audio data, such that resulting filtered audio data more accurately reflects spoken utterances of user(s). As another non-limiting example, by initializing and utilizing the beamformer locally at the computing device, latency in processing the audio data and/or obtaining responsive content to spoken utterances can be reduced and network resources can be conserved. Accordingly, by initializing and utilizing the beamformer according to techniques described herein, the computing device is improved.

The above description is provided as an overview of some implementations of the present disclosure. Further description of those implementations, and other implementations, are described in more detail below.

DETAILED DESCRIPTION

Figure 1:
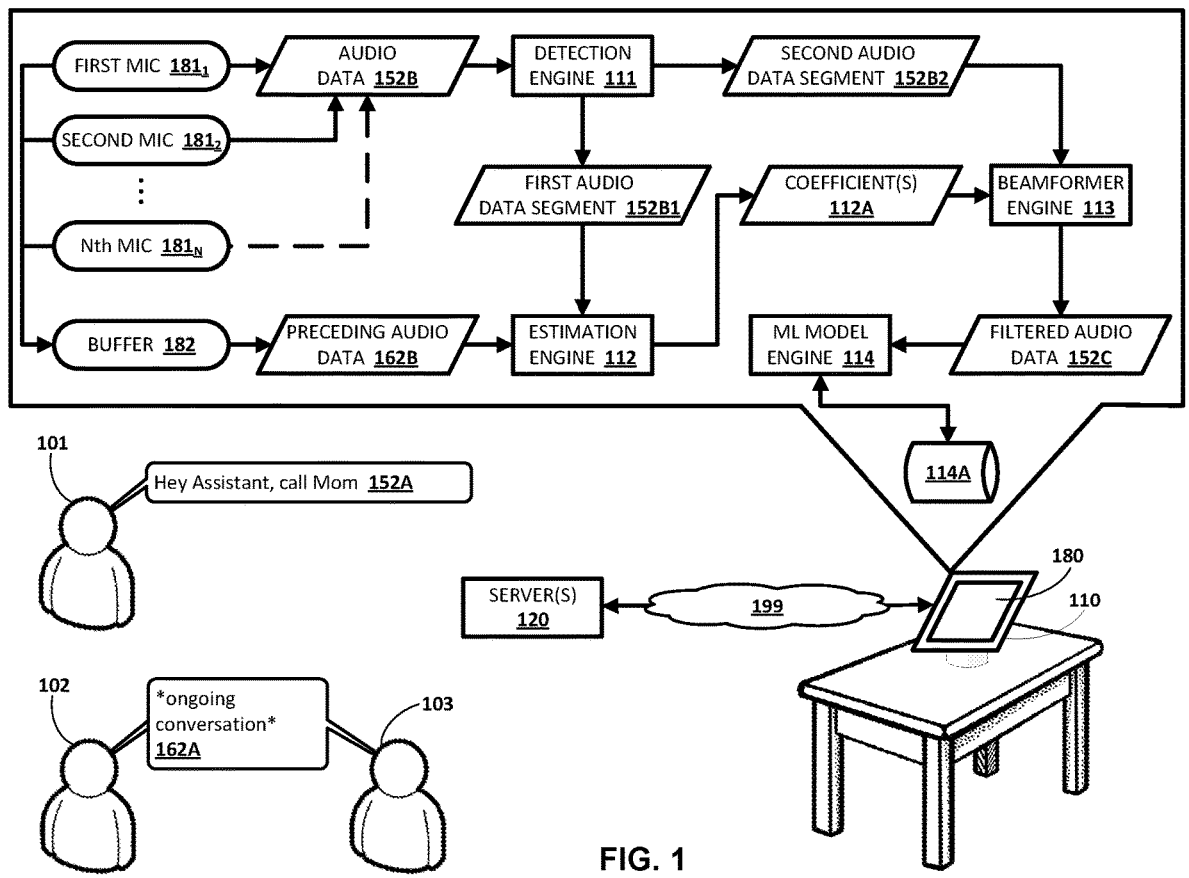
FIG. 1 depicts an example environment and process flow for initializing and utilizing a beamformer in processing audio received at a computing device, in accordance with various implementations.

FIG. 1 depicts a block diagram of an example environment that demonstrates various aspects of the present disclosure. A computing device 110 is co-located in an environment along with a first user 101, a second user 102, and a third user 103 (e.g., a multi-user environment) as illustrated in FIG. 1. The computing device 110 can include various components, such as a touchscreen display 180, one or more vision components (e.g., cameras or other vision components), one or more speakers, two or more microphones (e.g., near-field and/or far-field microphones) including at least a first microphone $181_1$ and a second microphone $181_2$, and so on through an Nth microphone $181_N$ (e.g., where N is a positive integer greater than two), an audio buffer 182 that stores (e.g., transiently) audio data generated by the two or more microphones, and/or other components. The computing device 110 can also include various engines, such as detection engine 111, estimation engine 112, beamformer engine 113, and machine learning (ML) model engine 114. The ML model engine 114 may have access to on-device storage 114A that stores one or more on-device ML models locally at the computing device 110.

Although the computing device 110 depicted in FIG. 1 is a standalone interactive speaker having the touchscreen display 180, it should be understood that is for the sake of example and is not meant to be limiting. The computing device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker without any display, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative computing devices may be provided.

For the sake of example, assume the first user 101 provides a spoken utterance 152A of "Hey Assistant, call Mom". Further assume that the first microphone $181_1$ and the second microphone $181_2$ (and any other microphones of the computing device 110) generate audio data 152B capturing the spoken utterance 152A. The detection engine 111 can process, using an on-device hotword model, the audio data 152A to determine whether the spoken utterance 152A includes one or more particular words and/or phrases that invoke or otherwise control an automated assistant executing at the computing device (e.g., "Hey Assistant", "Assistant", "Volume up", "Stop", and/or other words and/or phrases that can invoke or otherwise control an automated assistant). In response to the detection engine 111 determining that a first audio data segment 152B1 of the audio data 152B includes one or more of the particular words or phrases, the detection engine 111 can transmit the first audio data segment 152B1 to the estimation engine 112. In other words, the detection engine 111 can determine the spoken utterance includes one or more of words and/or phrases that invoke the automated assistant (e.g., "Hey Assistant" in the spoken utterance 152A), and can transmit the portion of the audio data 152B that captures one or more of words and/or phrases that invoke the automated assistant (e.g., the first audio data segment 152B1) to the estimation engine 112.

Moreover, in response to the detection engine 111 determining that a first audio data segment 152B1 of the audio data 152B includes one or more of the particular words or phrases, the computing device 110 can cause the audio buffer 182 to transmit a preceding audio data segment 162B to the estimation engine 112. In some implementations, the preceding audio data segment 162B can capture any ambient noises in the environment of the computing device 110 immediately prior to the first user 101 providing the spoken utterance 152A. In additional or alternative implementations, a statistical analysis of audio data stored in the audio buffer 182 can be performed (optionally on a delayed basis) until one or more of the particular words or phrases is detected, such that the preceding audio data segment 162B can be identified as one or more of the particular words or phrases is detected without having to go back to the audio buffer 182. For example, and as shown in the environment of FIG. 1, assume the second user 102 and the third user 103 are engaged in an ongoing conversation prior to the first user 101 providing the spoken utterance as indicated by 162A. In this example, the preceding audio data segment 162B can capture noise of the ongoing conversation between the second user 102 and the third user 103. The noise of the ongoing conversation can correspond to, for example, speech, laughter, coughing, sneezing, and/or any other ambient noises associated with the second user 102 and the third user 103. The preceding audio data 162B can additionally or alternatively capture ambient noise generated by other users and/or other objects that are also co-located in the environment of the computing device 110, such as ambient noise from speaker(s), a TV, alarms, lawn care equipment, house cleaning equipment, etc.

Although the working example of FIG. 1 is described with respect to the detection 111 processing the audio data 152B to identify one or more of words and/or phrases that invoke or otherwise control the automated assistant, it should be understood that is for the sake of example and is not meant to be limiting. For example, the first user 101 can invoke the automated assistant through other means, such as a gesture that can be captured by one or more of the vision components of the computing device 110 (e.g., a particular hand or arm movement to invoke or otherwise control the automated assistant) followed by a spoken utterance of "call Mom" without saying "Hey Assistant", lip movement and/or eye gaze directed to the computing device 110 (e.g., staring at the computing device) coupled with a spoken utterance of "call Mom" without saying "Hey Assistant", a button press (e.g., hardware or software button of the computing device 110) followed by a spoken utterance of "call Mom" without saying "Hey Assistant", and/or other means. In these examples, the first audio data segment 152B1 may simply correspond to "call Mom" and not include one or more of words and/or phrases that invoke or otherwise control the automated assistant. In other words, in these examples, the first audio data segment 152B1 can be identified based on determining the first audio data segment 152B1 follows an invocation of the automated assistant at the computing device 110. The first audio data segment 152B1 can be considered to follow the invocation of the automated assistant based on, for example, a timestamp associated with the invocation of the automated assistant.

For example, the first audio data segment 152B1 can include audio data captured between a first time and a second time that is subsequent to the timestamp associated with the invocation of the automated assistant, and the preceding audio data segment 162B can include audio data captured between a first time and a second time that is prior to the timestamp associated with the invocation of the automated assistant. In these examples, a duration of time between the first time and second time can be the same for identifying the first audio data segment 152B1 and the preceding audio data segment 162B (e.g., 1.5 seconds of audio data before the invocation corresponds to the preceding audio data segment 162B, and 1.5 seconds of audio data after the invocation corresponds to the first audio data segment 152B1). In additional or alternative examples, the duration of time between the first time and second time can differ for identifying the first audio data segment 152B1 and the preceding audio data segment 162B (e.g., 1.5 seconds of audio data before the invocation corresponds to the preceding audio data segment 162B, and 1.0 seconds of audio data after the invocation corresponds to the first audio data segment 152B1).

Although the above examples are provided with respect to times immediately before and immediately after the invocation of the automated assistant, it should be understood that is for the sake of example and is not meant to be limiting. For instance, there may be a buffer time period between these different time periods (e.g., a few hundred milliseconds or a second) to ensure the preceding audio data segment 162B captures ambient noise of the environment of FIG. 1, and to ensure the first audio data segment 152B1 captures a spoken utterance of the user of the computing device 110. Moreover, although the above examples are described with respect to occurring in the time domain, it should be understood that is for the sake of example and is not meant to be limiting. For instance, the audio data 152B and preceding audio data segment 162B can be processed using, for example, a short-time Fourier transform (STFT) to convert this audio data from the time domain to the frequency domain, and the operations to estimate a spatial correlation matrix as described herein and to initialize a beamformer as described herein can be performed in the frequency domain.

The estimation engine 112 can process the first audio data segment 152B1 and the preceding audio data segment 162B to estimate a spatial correlation matrix that measures a relationship between the different channels of audio data generated by the different microphones of the computing device 110. The estimated spatial correlation matrix can correspond to statistics relating to a desired source of the audio data 152B (e.g., the first user 101). In some implementations, the estimation engine 112 can generate a first audio data segment spatial covariance associated with the first audio data segment 152B1, and can generate a preceding audio data segment spatial covariance associated with the preceding audio data segment 162B. Further, the estimation engine 112 can estimate the spatial correlation matrix based on the first audio data segment spatial covariance and the preceding audio data segment spatial covariance. In some implementations, the estimation engine 112 can determine a principal eigenvector of the estimated spatial correlation matrix, and can utilize values associated with the principal eigenvector of the estimated spatial correlation matrix as a plurality of coefficients 112A. The estimation engine 112 can transmit the plurality of coefficients 112A to the beamformer engine.

The beamformer engine 113 can initialize a beamformer using the plurality of coefficients 112A. For example, the beamformer engine 113 can identify one or more first coefficients, of the plurality of coefficients 112A, to associated with a first channel of audio data (e.g., audio data generated by the first microphone $181_1$), one or more second coefficients, of the plurality of coefficients 112A, to associated with a second channel of audio data (e.g., audio data generated by the second microphone $181_2$), and so on for N channels of audio data (e.g., where N is a positive integer greater than two). The beamformer engine 113 can use the initialized beamformer to process any audio data generated by the two or more microphones of the computing device 110 during the dialog session. This can include, for example, the first audio data segment 152B1, a second audio data segment 152B2 of the audio data 152B that follows the first audio data segment 152B1 (e.g., capturing "call Mom"), and/or any additional audio data generated based on additional spoken utterances provided by the user. Accordingly, the beamformer can be "steered" towards the first user 101 that provided the spoken utterance 152A, such that resulting filtered audio data 152C includes audio data that captures one or more portions of the spoken utterance 152A and filters out or reduces any other audio data (e.g., that captures the ongoing conversation 162A).

Continuing with the example, the beamformer engine 113 can process at least the second audio data segment 152B2, using the beamformer, to generate the filtered audio data 152C. To generate the filtered audio data 152C, the beamformer can process a first channel of the second audio data segment 152B2 (e.g., generated using the first microphone $181_1$) using the one or more first coefficients, can process a second channel of the second audio data segment 152B2 (e.g., generated using the first microphone $181_2$) using the one or more second coefficients, and can process any additional respective channel of the second audio data segment 152B2 (e.g., generated using a respective one of the Nth microphones $181_N$) using one or more respective coefficients. The beamformer engine 113 can generate the filtered audio data 152C based on processing of the various channels of the second audio data segment 152B2 using the one or more respective coefficients associated with the various channels. Notably, in generating the filtered audio data 152C, the filtered channels of the second audio data segment 152B2 can be combined into a single channel. By combining the various filtered channels into the single channel for the filtered audio data 152C, consumption of network resources can be reduced if the filtered audio data 152C is transmitted away from the computing device 110.

The ML model engine 114 can process, using one or more acoustic-based ML models stored in the on-device memory 114A, the filtered audio data 152C to generate predicted output. For example, assume the on-device storage 114A includes an on-device automatic speech recognition (ASR) model. Further assume the ML model engine 114 processes, using the on-device ASR model, the filtered audio data 152C to generate one or more recognized terms for a portion of the spoken utterance 152A captured in the filtered audio data 152C. In this example, the one or more recognized terms can correspond to "call Mom" based on the spoken utterance 152A. In some implementations, a transcription of the one or more recognized terms can be visually rendered at the touchscreen display 180 of the computing device 110. As another example, assume the on-device storage 114A includes an on-device speaker identification model. Further assume the ML model engine 114 processes, using the on-device speaker identification model, the filtered audio data 152C to identify the first user 101 that provided the spoken utterance 152A (assuming a speaker embedding for the first user 101 is available to the computing device 110). By processing the filtered audio data 152C (rather than unfiltered audio data), precision and/or recall of the on-device acoustic-based models should be increased.

Moreover, the automated assistant can be controlled based on the processing of the spoken utterance 152A. For example, the automated assistant can initiate a telephone call with a contact entry "Mom" based on further processing of the spoken utterance 152A (e.g., based on output generated using natural language understanding (NLU) model(s) and/or fulfillment model(s)). The first user 101 can engage in a telephone conversation with "Mom" using the computing device 110, and additional audio data received at the computing device 110 can be processed using the beamformer engine 113 prior to being transmitted to an additional computing device associated with "Mom" using one or more voice communication protocols including, for example, Voice over Internet Protocol (VoIP), public switched telephone network (PSTN), and/or other telephonic communication protocols. Accordingly, any of the additional audio data transmitted to the additional computing device associated with "Mom" can be filtered such that any noises that do not originate from the first user 101 are removed from the additional audio data (e.g., the second user 102 and the third user 103 conversing and/or any other noises in the environment of the computing device 110).

In some implementations, the beamformer can be refined during the dialog session. The beamformer can be refined during the dialog session by updating the plurality of coefficients 112A based on additional audio data segments generated based on spoken utterances of the first user 101 and additional preceding audio data segments that capture ambient noises as described above. For example, the computing device 110 can cause an additional iteration of the process flow described with respect to FIG. 1 to be performed as the first user 110 engages in the telephone call with "Mom" via the computing device 110. The coefficients can be updated based on an additional audio data segment when the first user initiates the conversation (e.g., audio data capturing a spoken utterance "Hi Mom, how was your day?") and a preceding audio data segment (e.g., audio data capturing ambient noise of the environment depicted in FIG. 1 subsequent to the telephone call being initiated and prior to the user providing the spoken utterance "Hi Mom, how was your day?") in the same or similar manner described above with respect to the estimation engine 112. The beamformer can be reinitialized, utilized, and refined in the same and similar manner for subsequent dialog sessions between any user and the computing device 110.

In additional or alternative implementations, the computing device 110 can be communicatively coupled with one or more servers 120 over one or more networks 199 as depicted in FIG. 1. The one or more networks 199 can include, for example, any combination of local area networks (LANs), wide area networks (WANs), and/or any other type of networks. One or more aspects of the computing device 110 (e.g., the various engines, the automated assistant, and/or one or more of the ML models described with respect to the computing device 110) can be implemented remotely at the one or more servers 120. For example, the audio data 152B and the preceding audio data segment 152 can be transmitted to the one or more servers 120 over one or more of the networks 199, and the beamformer can be initialized at the one or more servers 120 for filtering audio data generated by microphones of the computing device 110. As another example, the beamformer can be initialized and utilized locally at the computing device 110 to generate filtered audio data, and the filtered audio data can be transmitted to the one or more servers 120 for further processing (e.g., using one or more cloud-based ML models, such as a cloud-based ASR model), and output can be transmitted back to the computing device 110 (e.g., recognized text generated using the cloud-based ASR model, responsive content for the spoken utterance 152A (e.g., an indication to initiate a telephone call with "Mom"), and/or other content). Accordingly, it should be understood that the techniques described herein can be performed locally at the computing device 110, remotely at the one or more servers 120, and/or any combination thereof.

By using the techniques described herein, various technical advantages can be achieved. As one non-limiting example, by initializing and utilizing the beamformer based on the estimated spatial correlation matrix, the beamformer can be adapted to various environments to filter noisy audio data. As a result, the acoustic-based ML model(s) that subsequently process the filtered audio data have greater precision and/or recall in processing the filtered noisy audio data. As another non-limiting example, by refining the estimated spatial correlation matrix throughout a dialog session (and for subsequent dialog sessions), the beamformer can be adapted to these various environments by filtering noisy audio data in a dynamic manner and by tracking a source of the desired audio data (e.g., the user). As a result, the beamformer can be dynamically "steered" towards the source of the audio data, such that resulting filtered audio data more accurately reflects spoken utterances of user(s). As another non-limiting example, by initializing and utilizing the beamformer locally at the computing device, latency in processing the audio data and/or obtaining responsive content to spoken utterances can be reduced and network resources can be conserved. Accordingly, by initializing and utilizing the beamformer according to techniques described herein, the computing device is improved.

Figure 2:
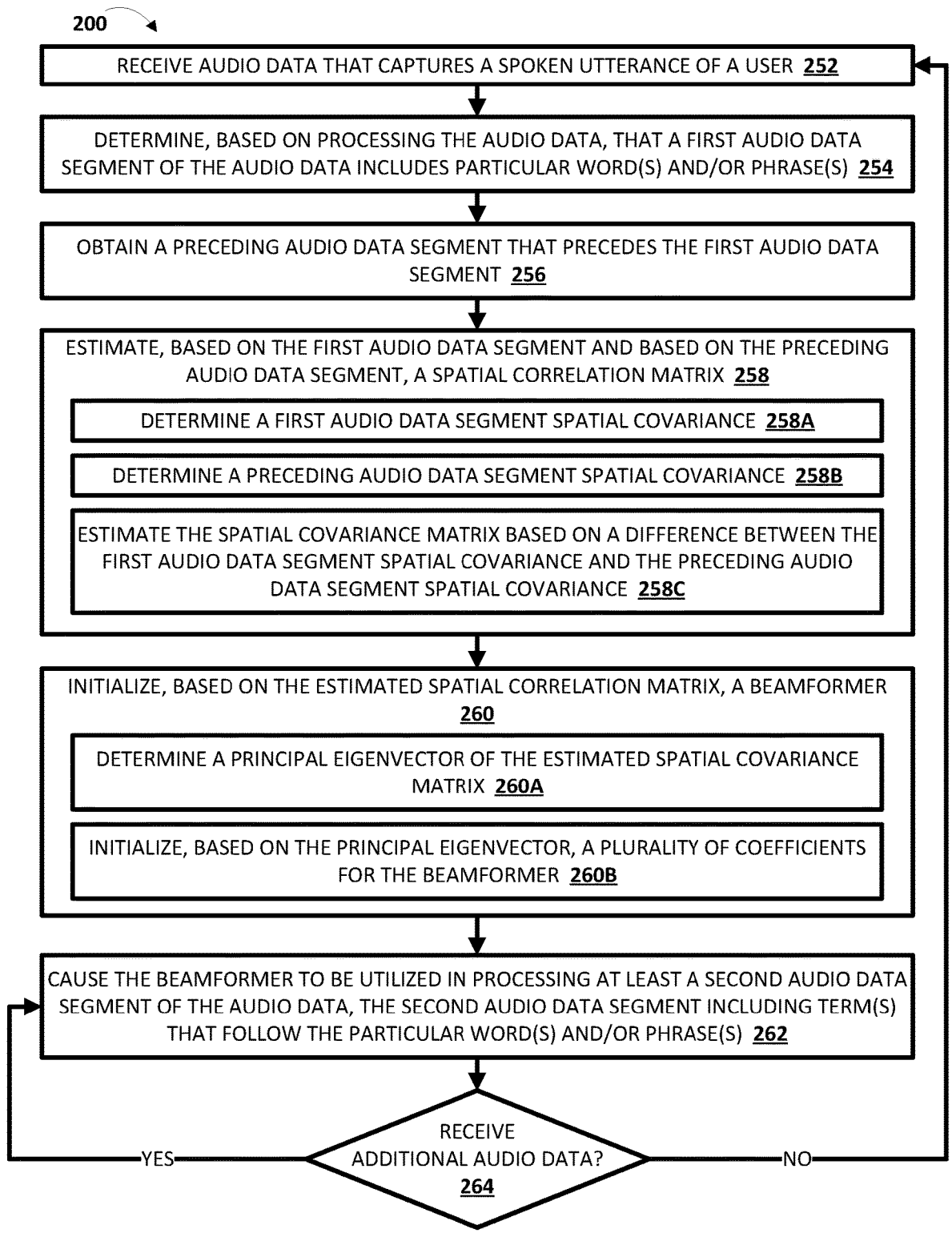
FIG. 2 depicts a flowchart illustrating an example method of initializing and utilizing a beamformer in processing audio received at a computing device, in accordance with various implementations.

Turning now to FIG. 2, a flowchart illustrating an example method 200 of initializing and utilizing a beamformer in processing audio received at a computing device is depicted. For convenience, the operations of the method 200 are described with reference to a system that performs the operations. The system of method 200 includes one or more processors and/or other component(s) of a computing device (e.g., computing device 110 of FIG. 1, server(s) 120 of FIG. 1, computing device 310 of FIG. 3, and/or other computing devices). Moreover, while operations of the method 200 are shown in a particular order, this is not meant to be limiting. One or more operations may be reordered, omitted, or added.

At block 252, the system receives audio data that captures a spoken utterance of a user. The audio data can be generated by two or more microphones of a computing device of the user. For example, first channel audio data can be generated using a first microphone, of the two or more microphones, and second channel audio data can be generated using a second microphone, of the two or more microphones. The audio data can be generated based on a combination of the first channel audio data and the second channel audio data.

At block 254, the system determines, based on processing the audio data, that a first audio data segment of the audio data includes one or more particular words and/or phrases. For example, the system can process, using a hotword detection model, the audio data to determine that the first audio data segment includes one or more particular words and/or phrases that invoke or otherwise control an automated assistant (e.g., "Hey Assistant", "Assistant", "Volume up", "Stop", and/or other words and/or phrases that can invoke or otherwise control an automated assistant). In other implementations, the system can identify the first audio data segment based on the first audio data segment being generated immediately after an automated assistant is otherwise invoked. For example, the automated assistant can additionally or alternatively be invoked via one or more gestures captured by vision component(s) of the computing device, via a button press (e.g., hardware or software button), via a squeeze of the computing device, and/or in other manners.

At block 256, the system obtains a preceding audio data segment that precedes the first audio data segment. The preceding audio data segment can be obtained from an audio buffer of the computing device. Further, the preceding audio data segment can capture ambient noise in the environment of the computing device, such as multiple users conversing in the environment (e.g., described with respect to the users 102 and 103 of FIG. 1), media playing in the environment, lawn care or cleaning sounds captured in the environment (e.g., a lawn mower, a vacuum cleaner), and/or any other ambient noise.

At block 258, the system estimates, based on the first audio data segment and based on the preceding audio data segment, a spatial correlation matrix. For example, and as indicated at sub-block 258A, the system can determine a first audio data segment spatial covariance associated with the first audio data segment. Further, and as indicated at sub-block 258B, the system can determine a preceding audio data segment spatial covariance associated with the preceding audio data segment. Moreover, and as indicated at sub-block 258C, the system can estimate the spatial covariance matrix based on a difference between the first audio data segment spatial covariance and the preceding audio data segment spatial covariance. In other words, the estimated spatial covariance matrix can be determined based on differences in the first audio data segment and the preceding audio data segment for the various channels that capture the first audio data segment and the preceding audio data segment.

At block 260, the system initializes, based on the estimated spatial covariance matrix, a beamformer. For example, and as indicated at sub-block 260A, the system can determine a principal eigenvector of the estimated spatial covariance matrix. Further, and as indicated at sub-block 260B, the system can initialize, based on the principal eigenvector, a plurality of coefficients for the beamformer. For instance, the system can initialize a first channel of the computing device with one or more first coefficients, of the plurality of coefficients, and the system can initialize a second channel of the computing device with one or more second coefficients, of the plurality of coefficients. The number of channels of the computing device may be directly proportional to the quantity of microphones of the computing device, and each of the respective channels may be associated with one or more respective coefficients determined based on the estimated spatial correlation matrix. Although block 260 is described with respect to initializing the plurality of coefficients for the beamformer based on the principal eigenvector of the estimated spatial correlation matrix, it should be understood that is for the sake of example and is not meant to be limiting. For example, the plurality of coefficients for the beamformer can be initialized based on other characteristics of the spatial correlation matrix.

At block 262, the system causes the beamformer to be utilized in processing at least a second audio data segment of the audio data, the second audio data segment including one or more terms that follow the one or more particular words and/or phrases. In some implementations, the system additionally causes the beamformer to be utilized in processing the first audio data segment. By utilizing the beamformer in processing of at least the second audio data segment, the beamformer can generate at least a filtered second audio data segment. The system can cause one or more acoustic-based machine learning (ML) models to further process the filtered second audio data segment (e.g., an automatic speech recognition (ASR) model, a speaker identification model, a continued conversation model, an end pointing model, and/or other acoustic-based ML models).

At block 264, the system determines whether additional audio data is received at the computing device. If, at an iteration of block 264, the system determines that additional audio data is received at the computing device, the system returns to block 262 and causes the beamformer to be utilized in processing at least the additional audio data that is received at block 264. Notably, the additional audio data that is received at block 264 corresponds to additional audio data received during the same dialog session between the user and an automated assistant that the audio data was received at block 252. Further, although the method 200 of FIG. 2 depicts the operations simply returning to block 262, it should be understood that the system can further refine the beamformer prior to processing the additional audio data (e.g., based on the second audio data segment and based on the preceding audio data segment and/or based on any other pairs of audio data that capture the noisy environment alone and the noisy environment in combination with additional spoken utterances). If, at an iteration of block 264, the system determines that no additional audio data is received at the computing device, the system returns to block 252 and re-initializes the beamformer upon receiving additional audio data that initiates a subsequent dialog session.

Although the method 200 of FIG. 2 is described with respect to being performed locally at the computing device, it should be understood that is for the sake of example and is not meant to be limiting. For example, the estimated spatial correlation matrix can be transmitted to one or more servers (e.g., the server(s) 120 of FIG. 1). Further, one or more of the servers can initialize the beamformer and transmit the initialized beamformer back to the computing device, utilize the beamformer to process audio data received from the computing device and transmit filtered audio data back to the computing device, utilize the beamformer to process audio data received from the computing device and transmit responsive content back to the computing device, and/or perform other operations described herein.

Figure 3:
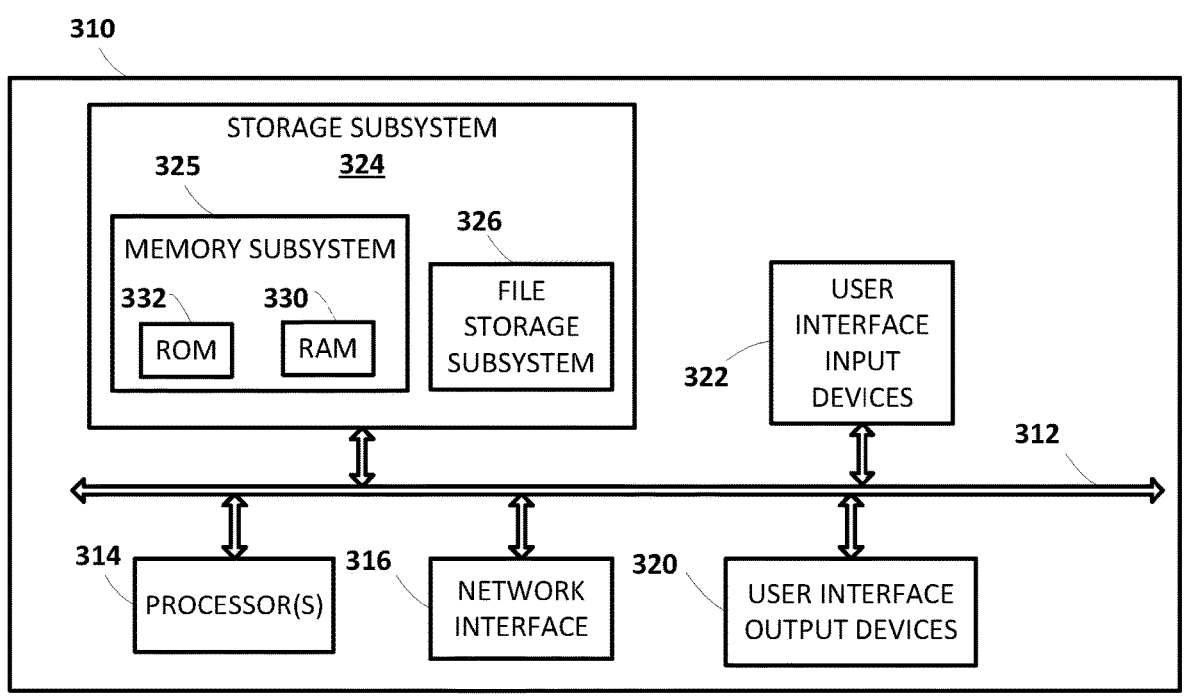
FIG. 3 depicts an example architecture of a computing device, in accordance with various implementations.

Turning now to FIG. 3, a block diagram of an example computing device 310 that may optionally be utilized to perform one or more aspects of techniques described herein is depicted. In some implementations, one or more of a client device, cloud-based automated assistant component(s), and/ or other component(s) may comprise one or more components of the example computing device 310.

Computing device 310 typically includes at least one processor 314 which communicates with a number of peripheral devices via bus subsystem 312. These peripheral devices may include a storage subsystem 324, including, for example, a memory subsystem 325 and a file storage subsystem 326, user interface output devices 320, user interface input devices 322, and a network interface subsystem 316. The input and output devices allow user interaction with computing device 310. Network interface subsystem 316 provides an interface to outside networks and is coupled to corresponding interface devices in other computing devices.

User interface input devices 322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 310 or onto a communication network.

User interface output devices 320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 310 to the user or to another machine or computing device.

Storage subsystem 324 stores programming and data constructs that provide the functionality of some or all of the modules described herein. For example, the storage subsystem 324 may include the logic to perform selected aspects of the methods disclosed herein, as well as to implement various components depicted in FIG. 1.

These software modules are generally executed by processor 314 alone or in combination with other processors. Memory 325 used in the storage subsystem 324 can include a number of memories including a main random access memory (RAM) 330 for storage of instructions and data during program execution and a read only memory (ROM) 332 in which fixed instructions are stored. A file storage subsystem 326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 326 in the storage subsystem 324, or in other machines accessible by the processor(s) 314.

Bus subsystem 312 provides a mechanism for letting the various components and subsystems of computing device 310 communicate with each other as intended. Although bus subsystem 312 is shown schematically as a single bus, alternative implementations of the bus subsystem may use multiple busses.

Computing device 310 can be of varying types including a workstation, server, computing cluster, blade server, server farm, or any other data processing system or computing device. Due to the ever-changing nature of computers and networks, the description of computing device 310 depicted in FIG. 3 is intended only as a specific example for purposes of illustrating some implementations. Many other configurations of computing device 310 are possible having more or fewer components than the computing device depicted in FIG. 3.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes receiving audio data that captures a spoken utterance of a user, the audio data being generated by two or more microphones of a computing device of the user; determining, based on processing the audio data, that a first audio data segment of the audio data includes one or more particular words or phrases; obtaining a preceding audio data segment that precedes the first audio data segment, the preceding audio data segment being generated by the two or more microphones of the computing device; estimating, based on the first audio data segment and based on the preceding audio data segment, a spatial correlation matrix; initializing, based on the estimated spatial correlation matrix, a beamformer; and causing the beamformer to be utilized in processing of at least a second audio data segment of the audio data, the second audio data segment including one or more terms that follow the one or more particular words or phrases.

These and other implementations of the technology can include one or more of the following features.

In some implementations, estimating the spatial correlation matrix based on the first audio data segment and based on the preceding audio data segment can include determining a first audio data segment spatial covariance associated with the first audio data segment; determining a preceding audio data segment spatial covariance associated with the preceding audio data segment; and estimating the spatial covariance matrix based on a difference between the first audio data segment spatial covariance and the preceding audio data segment spatial covariance.

In some implementations, initializing the beamformer based on the estimated spatial correlation matrix can include determining a principal eigenvector of the estimated spatial correlation matrix; and initializing, based on the principal eigenvector, a plurality of coefficients for the beamformer.

In some versions of those implementations, causing the beamformer to be utilized in processing of the second audio data segment can include processing, using the beamformer and based on the plurality of coefficients for the beamformer, the second audio data segment to generate a filtered second audio data segment; and processing, using an acoustic machine learning (ML) model, the filtered second audio data segment to generate predicted output associated with the one or more terms.

In some further versions of those implementations, processing the second audio data segment to generate the filtered second audio data segment using the beamformer and based on the plurality of coefficients for the beamformer can include processing, using one or more first coefficients, of the plurality of coefficients for the beamformer, a first channel of the second audio data segment to generate a first channel of the filtered second audio data segment, the first channel of the second audio data segment being generated by a first microphone of the two or more microphones; processing, using one or more second coefficients, of the plurality of coefficients for the beamformer, a second channel of the second audio data segment to generate a channel of the filtered second audio data segment, the second channel of the second audio data segment being generated by a second microphone of the two or more microphones; and generating, based on the first channel of the filtered second audio data segment and based on the second channel of the filtered second audio data segment, the filtered second audio data.

In additional or alternative versions of those further implementations, the acoustic ML model can be an automatic speech recognition (ASR) model, and processing the filtered second audio data segment to generate the predicted output can include processing, using the ASR model, the filtered second audio data segment to generate one or more recognized terms corresponding to the one or more terms. In yet further versions of those implementations, determining that the first audio data segment includes one or more of the particular words or phrases can include processing, using a hotword detection model, the audio data to determine the first segment audio data includes one or more of the particular words or phrases. In even yet further versions of those implementations, one or more of particular words or phrases can invoke an automated assistant, and the automated assistant can perform an automated assistant action based on the one or more recognized terms. In additional or alternative versions of those yet further implementations, the method can further include causing a transcription of the spoken utterance to be visually rendered for presentation to the user via a display of the computing device, wherein the transcription of the spoken utterances includes the one or more recognized terms.

In additional or alternative versions of those further implementations, the acoustic ML model can be a speaker identification model, and processing the filtered second audio data segment to generate the predicted output can include processing, using the speaker identification model, the filtered second audio data segment to identify the user that provided the spoken utterance.

In some implementations, the method can further include receiving additional audio data that captures an additional spoken utterance of the user, the additional audio data being generated by two or more microphones of a computing device of the user, and the additional audio data that captures the additional spoken utterance of the user being received subsequent to receiving the audio data that captures the spoken utterance of the user; processing, using the beamformer, the additional audio data to generate filtered additional audio data; and transmitting, over one or more networks, the filtered additional audio data to an additional computing device of an additional user.

In some implementations, the preceding audio data segment can be obtained from an audio data buffer. In some versions of those implementations, the preceding audio data segment can capture ambient noise of an environment of the computing device of the user.

In some implementations, the one or more processors can be executed locally at the computing device of the user.

In some implementations, a computing device is provided and includes at least one processor; at least two microphones; and memory storing instructions that, when executed, cause the at least one processor to: receive audio data that captures a spoken utterance of a user of the computing device, the audio data being generated by the at least two microphones of the computing device of the user; and identify, based on processing the audio data, a first audio data segment of the audio data. The instructions to identify that the first audio data segment of the audio data include instructions to: identify the first audio data segment of the audio data based on determining the first audio data segment of the audio data follows an invocation of an automated assistant at the computing device. The instructions further cause the at least one processor to: obtain a preceding audio data segment that precedes the first audio data segment, the preceding audio data segment being generated by the at least two microphones of the computing device; estimate, based on the first audio data segment and based on the preceding audio data segment, a spatial correlation matrix; initialize, based on the estimated spatial correlation matrix, a beamformer; and cause the beamformer to be utilized in processing of at least a second audio data segment of the audio data.

These and other implementations of the technology can include one or more of the following features.

In some implementations, the instructions to estimate the spatial correlation matrix based on the first audio data segment and based on the preceding audio data segment can include instructions to: determine a first audio data segment spatial covariance associated with the first audio data segment; determine a preceding audio data segment spatial covariance associated with the preceding audio data segment; and estimate the spatial covariance matrix based on a difference between the first audio data segment spatial covariance and the preceding audio data segment spatial covariance.

In some implementations, the instructions to initialize the beamformer based on the estimated spatial correlation matrix can include instructions to initialize, based on the estimated spatial correlation matrix, a plurality of coefficients of the beamformer. In some versions of those implementations, the instructions to cause the beamformer to be utilized in processing of the second audio data segment can include instructions to: process, using the beamformer and based on the plurality of coefficients for the beamformer, the second audio data segment to generate a filtered second audio data segment; and process, using an acoustic machine learning (ML) model, the filtered second audio data segment to generate predicted output associated with the one or more terms. In some further versions of those implementations, the instructions to process the second audio data segment to generate the filtered second audio data segment using the beamformer and based on the plurality of coefficients for the beamformer can include instructions to: process, using one or more first coefficients, of the plurality of coefficients for the beamformer, a first channel of the second audio data segment to generate a first channel of the filtered second audio data segment, the first channel of the second audio data segment being generated by a first microphone of the two or more microphones; process, using one or more second coefficients, of the plurality of coefficients for the beamformer, a second channel of the second audio data segment to generate a channel of the filtered second audio data segment, the second channel of the second audio data segment being generated by a second microphone of the two or more microphones; and generate, based on the first channel of the filtered second audio data segment and based on the second channel of the filtered second audio data segment, a single channel of the filtered second audio data segment as the filtered second audio data segment.

In some implementations, a non-transitory computer-readable storage medium storing instructions locally at a computing device is provided, and the instructions, when executed, cause at least one processor to: receive audio data that captures a spoken utterance of a user of the computing device, the audio data being generated by at least two microphones of the computing device of the user; determine, based on processing the audio data, that a first audio data segment of the audio data includes one or more particular words or phrases; obtain a preceding audio data segment that precedes the first audio data segment, the preceding audio data segment being generated by the at least two microphones of the computing device; estimate, based on the first audio data segment and based on the preceding audio data segment, a spatial correlation matrix; initialize, based on the estimated spatial correlation matrix, a beamformer; and cause the beamformer to be utilized in processing of at least a second audio data segment of the audio data, the second audio data segment including one or more terms that follow the one or more particular words or phrases.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors, the method comprising:
receiving audio data that captures a spoken utterance of a user, the audio data being generated by two or more microphones of a computing device of the user;
determining, based on processing the audio data, that a first audio data segment of the audio data includes one or more particular words or phrases;
obtaining, from an audio data buffer, a preceding audio data segment that precedes the first audio data segment, the preceding audio data segment being generated by the two or more microphones of the computing device, the preceding audio data capturing ambient noise of an environment of the computing device of the user immediately prior to the audio data that captures the spoken utterance of the user being received, and the preceding audio data capturing the ambient noise of the environment of the computing device of the user immediately prior to the audio data that captures the spoken utterance of the user being received captures the ambient noise for a threshold duration of time prior to the spoken utterance being provided by the user;
estimating, based on the first audio data segment that includes the one or more particular words or phrases and based on the preceding audio data segment that captures the ambient noise of the environment of the computing device of the user immediately prior to the audio data that captures the spoken utterance of the user being received, a spatial correlation matrix;
initializing, based on the estimated spatial correlation matrix, a beamformer;
causing the beamformer to be utilized in processing of at least a second audio data segment of the audio data, the second audio data segment including one or more terms that follow the one or more particular words or phrases; and
subsequent to causing the beamformer to be utilized in processing of at least a second audio data segment of the audio data:
determining whether additional audio data that captures an additional spoken utterance of the user has been received; and
in response to determining that additional audio data that captures an additional spoken utterance of the user has been received:
estimating, based on the second audio data segment that includes the one or more terms that follow the one or more particular words or phrases and based on the additional audio data, an additional spatial correlation matrix;
re-initializing, based on the additional estimated spatial correlation matrix, the beamformer; and
causing the beamformer to be utilized in processing of the additional audio data.

2. The method of claim 1, wherein estimating the spatial correlation matrix based on the first audio data segment and based on the preceding audio data segment comprises:
determining a first audio data segment spatial covariance associated with the first audio data segment;
determining a preceding audio data segment spatial covariance associated with the preceding audio data segment; and
estimating the spatial covariance matrix based on a difference between the first audio data segment spatial covariance and the preceding audio data segment spatial covariance.

3. The method of claim 1, wherein initializing the beamformer based on the estimated spatial correlation matrix comprises:
determining a principal eigenvector of the estimated spatial correlation matrix; and
initializing, based on the principal eigenvector, a plurality of coefficients for the beamformer.

4. The method of claim 3, wherein causing the beamformer to be utilized in processing of the second audio data segment comprises:
processing, using the beamformer and based on the plurality of coefficients for the beamformer, the second audio data segment to generate a filtered second audio data segment; and processing, using an acoustic machine learning (ML) model, the filtered second audio data segment to generate predicted output associated with the one or more terms.

5. The method of claim 4, wherein processing the second audio data segment to generate the filtered second audio data segment using the beamformer and based on the plurality of coefficients for the beamformer comprises:

processing, using one or more first coefficients, of the plurality of coefficients for the beamformer, a first channel of the second audio data segment to generate a first channel of the filtered second audio data segment, the first channel of the second audio data segment being generated by a first microphone of the two or more microphones;

processing, using one or more second coefficients, of the plurality of coefficients for the beamformer, a second channel of the second audio data segment to generate a channel of the filtered second audio data segment, the second channel of the second audio data segment being generated by a second microphone of the two or more microphones; and generating, based on the first channel of the filtered second audio data segment and based on the second channel of the filtered second audio data segment, the filtered second audio data.

6. The method of claim 4, wherein the acoustic ML model is an automatic speech recognition (ASR) model, and wherein processing the filtered second audio data segment to generate the predicted output comprises:

processing, using the ASR model, the filtered second audio data segment to generate one or more recognized terms corresponding to the one or more terms.

7. The method of claim 6, wherein determining that the first audio data segment includes one or more of the particular words or phrases comprises:

processing, using a hotword detection model, the audio data to determine the first segment audio data includes one or more of the particular words or phrases.

8. The method of claim 7, wherein one or more of particular words or phrases invoke an automated assistant, and wherein the automated assistant performs an automated assistant action based on the one or more recognized terms.

9. The method of claim 6, further comprising:

causing a transcription of the spoken utterance to be visually rendered for presentation to the user via a display of the computing device, wherein the transcription of the spoken utterances includes the one or more recognized terms.

10. The method of claim 4, wherein the acoustic ML model is a speaker identification model, and wherein processing the filtered second audio data segment to generate the predicted output comprises:

processing, using the speaker identification model, the filtered second audio data segment to identify the user that provided the spoken utterance.

11. The method of claim 1, further comprising:

receiving additional audio data that captures an additional spoken utterance of the user, the additional audio data being generated by two or more microphones of a computing device of the user, and the additional audio data that captures the additional spoken utterance of the user being received subsequent to receiving the audio data that captures the spoken utterance of the user;

processing, using the beamformer, the additional audio data to generate filtered additional audio data; and transmitting, over one or more networks, the filtered additional audio data to an additional computing device of an additional user.

12. The method of claim 1, wherein the one or more processors are executed locally at the computing device of the user.

13. The method of claim 1, further comprising:

in response to determining that no additional audio data that captures an additional spoken utterance of the user has been received:

monitoring for the additional audio data that captures the additional spoken utterance of the user; and re-initializing, based on the processing of the additional audio data, the beamformer.

14. A computing device comprising:

at least one processor;

at least two microphones; and memory storing instructions that, when executed, cause the at least one processor to:

receive audio data that captures a spoken utterance of a user of the computing device, the audio data being generated by the at least two microphones of the computing device of the user;

identify, based on processing the audio data, a first audio data segment of the audio data, wherein the instructions to identify that the first audio data segment of the audio data comprise instructions to:

identify the first audio data segment of the audio data based on determining the first audio data segment of the audio data follows an invocation of an automated assistant at the computing device;

obtain, from an audio data buffer, a preceding audio data segment that precedes the first audio data segment, the preceding audio data segment being generated by the at least two microphones of the computing device, the preceding audio data capturing ambient noise of an environment of the computing device of the user immediately prior to the audio data that captures the spoken utterance of the user being received, and the preceding audio data capturing the ambient noise of the environment of the computing device of the user immediately prior to the audio data that captures the spoken utterance of the user being received captures the ambient noise for a threshold duration of time prior to the spoken utterance being provided by the user;

estimate, based on the first audio data segment that follows the invocation of the automated assistant at the computing device and based on the preceding audio data segment that captures the ambient noise of the environment of the computing device of the user immediately prior to the audio data that captures spoken utterance of the user being received, a spatial correlation matrix;

initialize, based on the estimated spatial correlation matrix, a beamformer;

cause the beamformer to be utilized in processing of at least a second audio data segment of the audio data; and subsequent to causing the beamformer to be utilized in processing of at least a second audio data segment of the audio data:

determine whether additional audio data that captures an additional spoken utterance of the user has been received; and in response to determining that additional audio data that captures an additional spoken utterance of the user has been received:
estimate, based on the second audio data segment that includes the one or more terms that follow the one or more particular words or phrases and based on the additional audio data, an additional spatial correlation matrix;
re-initialize, based on the additional estimated spatial correlation matrix, the beamformer; and
cause the beamformer to be utilized in processing of the additional audio data.

15. The computing device of claim 14, wherein the instructions to estimate the spatial correlation matrix based on the first audio data segment and based on the preceding audio data segment comprise instructions to:
determine a first audio data segment spatial covariance associated with the first audio data segment;
determine a preceding audio data segment spatial covariance associated with the preceding audio data segment; and
estimate the spatial covariance matrix based on a difference between the first audio data segment spatial covariance and the preceding audio data segment spatial covariance.

16. The computing device of claim 14, wherein the instructions to initialize the beamformer based on the estimated spatial correlation matrix comprise instructions to:
initialize, based on the estimated spatial correlation matrix, a plurality of coefficients of the beamformer.

17. The computing device of claim 16, wherein the instructions to cause the beamformer to be utilized in processing of the second audio data segment comprise instructions to:
process, using the beamformer and based on the plurality of coefficients for the beamformer, the second audio data segment to generate a filtered second audio data segment; and
process, using an acoustic machine learning (ML) model, the filtered second audio data segment to generate predicted output associated with the one or more terms.

18. The computing device of claim 17, wherein the instructions to process the second audio data segment to generate the filtered second audio data segment using the beamformer and based on the plurality of coefficients for the beamformer comprise instructions to:
process, using one or more first coefficients, of the plurality of coefficients for the beamformer, a first channel of the second audio data segment to generate a first channel of the filtered second audio data segment, the first channel of the second audio data segment being generated by a first microphone of the two or more microphones;
process, using one or more second coefficients, of the plurality of coefficients for the beamformer, a second channel of the second audio data segment to generate a channel of the filtered second audio data segment, the second channel of the second audio data segment being generated by a second microphone of the two or more microphones; and
generate, based on the first channel of the filtered second audio data segment and based on the second channel of the filtered second audio data segment, a single channel of the filtered second audio data segment as the filtered second audio data segment.

19. A non-transitory computer-readable storage medium storing instructions locally at a computing device that, when executed, cause at least one processor to:
receive audio data that captures a spoken utterance of a user of the computing device, the audio data being generated by at least two microphones of the computing device of the user;
determine, based on processing the audio data, that a first audio data segment of the audio data includes one or more particular words or phrases;
obtain, from an audio data buffer, a preceding audio data segment that precedes the first audio data segment, the preceding audio data segment being generated by the at least two microphones of the computing device, the preceding audio data capturing ambient noise of an environment of the computing device of the user immediately prior to the audio data that captures the spoken utterance of the user being received, and the preceding audio data capturing the ambient noise of the environment of the computing device of the user immediately prior to the audio data that captures the spoken utterance of the user being received captures the ambient noise for a threshold duration of time prior to the spoken utterance being provided by the user;
estimate, based on the first audio data segment that includes the one or more particular words or phrases and based on the preceding audio data segment that captures the ambient noise of the environment of the computing device of the user immediately prior to the audio data that captures the spoken utterance of the user being received, a spatial correlation matrix;
initialize, based on the estimated spatial correlation matrix, a beamformer;
cause the beamformer to be utilized in processing of at least a second audio data segment of the audio data, the second audio data segment including one or more terms that follow the one or more particular words or phrases; and
subsequent to causing the beamformer to be utilized in processing of at least a second audio data segment of the audio data:
determine whether additional audio data that captures an additional spoken utterance of the user has been received; and
in response to determining that additional audio data that captures an additional spoken utterance of the user has been received:
estimate, based on the second audio data segment that includes the one or more terms that follow the one or more particular words or phrases and based on the additional audio data, an additional spatial correlation matrix;
re-initialize, based on the additional estimated spatial correlation matrix, the beamformer; and
cause the beamformer to be utilized in processing of the additional audio data.

\* \* \* \* \*